US005700751A

United States Patent [19]
Yang

[11] Patent Number: 5,700,751
[45] Date of Patent: Dec. 23, 1997

[54] CATALYST FOR TREATMENT OF WASTE PLASTICS AND METHOD OF MANUFACTURING THE SAME

[75] Inventor: Yali Yang, Beijing, China

[73] Assignee: Plastic Advanced Recycling Corp., Burr Ridge, Ill.

[21] Appl. No.: 607,869

[22] Filed: Feb. 27, 1996

[30] Foreign Application Priority Data

Nov. 23, 1995 [CN] China ............................. 95117514.9

[51] Int. Cl.$^6$ ....................................... B01J 21/04
[52] U.S. Cl. ..................... 502/255; 502/405; 502/406; 502/407; 502/232; 502/233; 502/235; 502/240; 502/254; 502/257; 502/258; 502/262
[58] Field of Search ................... 502/405, 406, 502/407, 232, 233, 235, 240, 254, 255, 257, 258, 262

[56] References Cited

U.S. PATENT DOCUMENTS

| | | | |
|---|---|---|---|
| 2,698,305 | 12/1954 | Plank et al. | 252/454 |
| 2,854,403 | 9/1958 | Weisz | 204/138 |
| 3,231,518 | 1/1966 | Church | 502/232 |
| 4,514,519 | 4/1985 | Hobbs | 502/243 |
| 4,654,321 | 3/1987 | Pesa et al. | 502/331 |
| 4,764,498 | 8/1988 | Wissner et al. | 502/251 |
| 4,851,601 | 7/1989 | Fukuda et al. | 585/241 |
| 4,870,045 | 9/1989 | Gasper et al. | 502/232 |
| 5,364,825 | 11/1994 | Neuman et al. | 502/240 |
| 5,510,555 | 4/1996 | Brunelli et al. | 502/240 |

FOREIGN PATENT DOCUMENTS 5345894  12/1993  Japan ........................ C10G 1/10

*Primary Examiner*—Glenn Caldarola
*Assistant Examiner*—Nadine Preisch
*Attorney, Agent, or Firm*—Ladas & Parry

[57] ABSTRACT

A fixed-bed catalyst is used for treating waste plastics to produce hydrocarbon fractions, gasoline and diesel oil. The catalyst comprises a silica carrier and active components having the formula of $A_a B_b Al_c M_d Na_e Ca_f Fe_g O_x$. In the formula, A represents potassium, barium, phosphorus, vanadium, chromium, rare earth elements or their mixture. B represents elements of tungsten, molybdenum, nickel, germanium and platinum series. This catalyst has very high selectivity and activity and can be used for reaction at a relatively low temperature, thereby reducing energy consumption, and ensuring good yield of product. The mixed hydrocarbons generated by catalytic reaction using this catalyst may comprise more than 30 percent of aromatics and cyclanes in content.

11 Claims, No Drawings

CATALYST FOR TREATMENT OF WASTE PLASTICS AND METHOD OF MANUFACTURING THE SAME

FIELD OF THE INVENTION

This invention relates to a catalyst used for treatment of waste plastics to obtain hydrocarbon fractions, gasoline and diesel oil, particularly to a fixed bed catalyst.

BACKGROUND OF THE INVENTION

With the rapid development of plastic industry, plastic products are getting more and more important in our daily life and in the industrial production. Hence, more wastes from plastics are generated in accompanying with the abundant applications of plastics. Because the waste plastics can hardly be decomposed by themselves under natural condition, the waste plastics have polluted our survival environment seriously. Therefore, it has become a key problem for us to solve the pollution caused by the waste plastics, and to recover and re-utilize the waste plastics by processes of deharmfulness treatment and resource utilization.

So far, various methods have been proposed for treating waste plastics. Generally, a catalyst will be used for catalyzing thermal cracking of the waste plastics. For example, a method of treating waste plastics is described in U.S. Pat. No. 4,851,601, which includes disintegration of waste plastics, thermal cracking of the waste plastics in the reactor, and further catalytic cracking of vapor products by ZSM-5 catalyst with a medium-sized pore diameter. The product is then separated by a conventional technology. Another method known from JP-A-5-345894 is that waste plastics are thermally cracked at 200°–700° C., and then the product is catalytically cracked at 230°–650° C.

At present, most catalysts used to treat waste plastics are molecular sieve type, such as the above mentioned ZSM-5. When the catalysts are used in the above mentioned technologies to treat the waste plastics, there are certain disadvantages, such as the high temperature required for treatment, high energy-consumption, bad stability against oxidation for products, high cost and complicated manufacturing process for the catalysts, etc. Moreover, the pretreatment of cleaning and drying is needed, and serious carbonization occurs in the inner part of the reactor.

SUMMARY OF THE INVENTION

The present invention is aimed to solve the problems mentioned above and provide a catalyst which is of low-cost, simple operation, good product stability against oxidation and lower reaction temperature.

In accordance with this invention, a fixed-bed catalyst used for treating waster plastics comprises a carrier and a mixture of active components having the following formula:

Wherein A is selected from the group consisting of potassium, barium, phosphorus, vanadium, chromium, rare earth elements and their mixture; B selected from the group consisting of molybdenum, tungsten, nickel, germanium and platinum series; wherein a is from 25 to 26.35 percent by weight, b from 36 to 37.05 percent by weight; c from 7.2 to 9 percent by weight, d from 1.14 to 1.55 percent by weight, e from 1.75 to 2.15 percent by weight, f from 2.40 to 2.80 percent by weight, g from 2.42 to 3.2 percent by weight, and wherein x is a sum of oxygen needed to the chemical bonding valences of said components in the catalyst. The carrier is a silica carrier. The content of the silica carrier in the catalyst has a range of 17 to 22% by weight.

A manufacturing and preparing method for this catalyst may be similar to those normal methods of any catalyst manufacturing, but has its own distinctive features. All components in the present catalyst is blended into a quasi thin silica powder at a ratio of less than 1:0.1. Then, the mixture is made into a slurry with $Na_2SiO_3$, and through a double roller machine to form pellets of diameter ($\Phi$) about 6 mm and length 6 mm ($\Phi$6 mm×6 mm). Then, the pellets are roasted under a temperature of 400° C.–800° C. to obtain the final product of catalyst. The roasting process is continuous without any pause during the roasting. The formation process of every element component of the catalyst is to be finished below 400° C. Therefore, the temperature increase should be controlled when it is approaching 400° C., that is, to keep the temperature between 300° C. to 400° C. for 20 to 30 minutes. The roasting and final formation are respectively conducted between the temperature from 400° C. to 800° C. A mass production can be carried out in a small concrete rotary kiln, with the complete period to be controlled within 4 to 5 hours.

DETAILED DESCRIPTION OF THE INVENTION

The catalyst of this invention includes a silica carrier and a mixture of active components having the formula:

The components of the catalyst related to this invention are taken from the following raw materials. The component A uses the oxides of potassium, barium, phosphorus, vanadium, chromium, and rare earth elements. The component B uses the oxides of molybdenum, tungsten, nickel, germanium and platinum group elements. The component Al uses $Al_2O_3$. The component M uses WO or $(NH_4)_2WO_4$. The component Na uses $Na_2SiO_3$, $NaNO_3$ NaOH or other sodium compounds. The component Ca uses $CaCO_3$. The component Fe uses $Fe_3O_4$. A silica gel can be used as the silica carrier in the catalyst.

When the catalyst of this invention is being prepared, the raw materials for the components A and B can use all kinds of the oxides mentioned above respectively, or use one raw material containing all of the oxides mentioned above. The present inventor has discovered that a useful material is a tail-ore product of gold ores containing the oxides of potassium, barium, phosphorus, vanadium chromium and rare-earth elements, and the oxides of molybdenum, tungsten, nickel, germanium and platinum group elements. It is further found that the catalyst manufactured from the tail-ore product of gold ores possesses satisfactory performance. Therefore, it is a further advantage for this invention to make use of the waste materials causing pollution to the environment and achieve the aim of the environmental protection. When the catalyst of this invention is being prepared by the tail-ore product of gold ore, the contents of the various components of the tail-ore vary with the different natural conditions of the gold ores. Thus, it is necessary to adjust their amounts in accordance with analytical data.

According to this invention, the tail-ore product of gold ores is the optimal raw material for components A and B. However, any product having the listed elements should be equally acceptable as stated above.

When the waste plastics of polypropylene (PP), polyethylene (PE) and polystyrene (PS) are cracked into hydrocarbons by use of the catalyst of this invention, a mixture of various hydrocarbon fractions is obtained, which comprises 25 to 35% of alkane, 45 to 55% alkene, 10 to 15% of cyclanes and 15 to 23% of aromatics. The distribution of hydrocarbon fractions is relatively ideal, from which many chemical products can be obtained by proper methods of separation. Gasoline and diesel oil products can be obtained by rectification to separate the two fractions directly.

When the waste plastics are treated with the catalyst of this invention, the raw material PP, PE and PS are put into the reactor directly without any cleaning treatment. The reaction temperature needed is 150° C. lower than those using the catalysts of other technologies. Also, during the whole process of catalytic cracking, the yield of lean gas decreases, which increases the yield of the mixed hydrocarbon fractions by 3%. The ratio of catalyst to raw material treated is 1.5% by weight.

When the catalyst of this invention used in a fixed-bed reactor, the temperature of reaction ranges from 280° C. to 480° C., where the optimal temperature ranges from 280° C. to 415° C. The pressure of the reaction system ranges from 0.01 to 0.04 MPa, where the optimal reaction pressure is 0.025 MPa.

When the catalyst of this invention is used to decompose the waste plastics, a mixture of liquid fractions with the distribution of hydrocarbons mentioned above can be obtained by one-step process. When the mixed hydrocarbon fractions are put into the storage tank, the rectification can be proceeded directly to obtain gasoline and diesel oil and further processed by extraction, reaction, and fractionating so that other chemical products, such as benzene, toluene, xylene, butane and butadiene, etc., can be obtained.

Further explanation to this invention, the catalyst and preparation method, will be given with reference to the following examples:

EXAMPLE 1

100 grams of the tail ore mentioned above is pulverized together with a mixture of 7 grams of $Al_2O_3$, 4 grams of $MoS_2$, 2.5 grams of $NaNO_3$, 2.4 grams of $CaCO_3$, 2.42 grams of $Fe_3O_4$ into a powder of 80–120 μm in size, and then blended with 30 grams of quasi thin alumina powder. Then, the mixture obtained is mixed with 30 grams of silica gel to form a slurry with the addition of water. From the slurry, pellets of Φ6 mm×6 mm are formed through a double roller machine. Then, the pellets are treated for about 25 minutes at 400° C. and roasted for 3 hours at 650° C. to obtain the catalyst for this invention.

The catalyst obtained comprises $A_a$ consisting of K of 0.035–1, $B_a$ of 0.01–0.05, P of 0.01–0.05, Cr of 0.001–0.005, and R.E. of 0.01–0.7, wherein the optimal value is K of 0.08, Ba of 0.015, P of 0.025, Cr of 0.001, and R.E. of 0.3; $B_b$ consisting of Mo of 0.02–1, W of 0.1–2.5, Ni of 0.01–0.04, Ge of 0.01–2, and Ru, Rh, Pd, Os, Ir, Pt of 0.01–0.02, wherein the optimal value is Mo of 0.075, W of 1.8, Ni of 0.025, Ge of 1.3, and Ru, Rh, Pd, Os, Ir, Pt of 0.01; and $Al_c$ of 7; $MoS_{2d}$ of 4; $Na_e$ of 3.5; $Ca_f$ of 2.4; $Fe_g$ of 2.42; $O_x$ of the required amount.

EXAMPLE 2

140 grams of the tail-ore mentioned above is pulverized together with a mixture of 10 grams of $Al_2O_3$, 5 grams of $MoS_2$, 5 grams of $NaNO_3$, 4 grams of $CaCO_3$, 2.42 grams of $Fe_3O_4$ into a powder of 80–120 μm in size, and blended with 30 grams of quasi thin alumina powder. Then, the mixture obtained is mixed with 60 grams of silica gel to form a slurry with the addition of water. Pellets of Φ6 mm×6 mm are formed by the double roller machine. Then, the pellets are treated for about 25 minutes at 400° C. and roasted for 3 hours at 650° C. to obtain the catalyst of this invention.

The catalyst obtained comprises $A_a$ consisting of K of 0.035–1, Ba of 0.01–0.05, P of 0.01–0.05, Cr of 0.001–0.005, and R.E. of 0.01–0.7, wherein the optimal value is K of 0.08, Ba of 0.015, P of 0.025, Cr of 0.001, and R.E. of 0.3; $B_b$ consisting of Mo of 0.02–1, W of 0.1–2.5, Ni of 0.01–0.04, Ge of 0.01–2, and Ru, Rh, Pd, Os, Ir, Pt of 0.01–0.02, wherein the optimal value is Mo of 0.075, W of 1.8, Ni of 0.025, Ge of 1.3, and Ru, Rh, Pd, Os, Ir, Pt of 0.01; and $Al_c$ of 10; $MoS_{2d}$ of 5; $Na_e$ of 5; $Ca_f$ of 4; $Fe_g$ of 2.42; $O_x$ of the required amount.

EXAMPLE 3

140 grams of the tail-ore mentioned above is pulverized together with a mixture of 15 grams of $Al_2O_3$, 7 grams of $MoS_2$, 7 grams of $NaNO_3$, 5.5 grams of $CaCO_3$, 2.42 grams of $Fe_3O_4$ into a powder of 80–120 μm in size, and blended with 30 grams of quasi thin alumina powder. Then, the mixture obtained is mixed with 75 grams of silica gel to form a slurry with the addition of water. Pellets of Φ6 mm×6 mm are formed by the double roller machine. Then, the pellets are treated for about 25 minutes at 400° C. and roasted for 3 hours at 650° C. to obtain the catalyst of this invention.

The catalyst obtained comprises $A_a$ consisting of K of 0.035–1, Ba of 0.01–0.05, P of 0.01–0.05, Cr of 0.001–0.005, and R.E. of 0.01–0.7, wherein the optimal value is K of 0.08, Ba of 0.015, P of 0.025, Cr of 0.001, and R.E. of 0.3; $B_b$ consisting of Mo of 0.02–1, W of 0.1–2.5, Ni of 0.01–0.04, Ge of 0.01–2, and Ru, Rh, Pd, Os, It, Pt of 0.01–0.02, wherein the optimal value is Mo of 0.075, W of 1.8, Ni of 0.025, Ge of 1.3, and Ru, Rh, Pd, Os, Ir, Pt of 0.01; and $Al_c$ of 15; $MoS_{2d}$ of 7, $Na_e$ of 7; $Ca_f$ of 5.5; $Fe_g$ of 2.42; $O_x$ of the required amount.

APPLICATION EXAMPLE 1

15 grams of the catalyst obtained from example 1 is added to a 3-liter rector, and 1000 g. of uncleaned agricultural plastic films are added by several batches. The temperature is raised to 400±°40° C. 30–40 grams of gas product and 820–840 grams of liquid product are obtained by means of a 2-stage condensation system and the composition of the obtained liquid product is shown in table 1 below:

TABLE 1

| component | A (g) |
| --- | --- |
| n-alkane | 9.88 |
| iso-alkane | 11.80 |
| Σ alkene | 47.57 |
| n-alkene | 17.14 |
| iso-alkene | 30.43 |
| cyclanes | 9.47 |
| aromatics | 21.28 |

APPLICATION EXAMPLE 2

The catalyst obtained from example 2 is used, and the other processing conditions are the same. The composition of the obtained liquid product is presented in table 2 below:

TABLE 2

| component | B (g) |
| --- | --- |
| n-alkane | 27.73 |
| iso-alkane | 10.98 |
| Σ alkene | 41.68 |
| n-alkene | 18.16 |
| iso-alkene | 23.52 |
| cyclanes | 10.29 |
| aromatics | 9.32 |

APPLICATION EXAMPLE 3

The catalyst obtained from example 3 is used, and the other processing conditions are the same. The composition of the obtained liquid product is presented in table 3 below:

TABLE 3

| component | C (g) |
| --- | --- |
| n-alkane | 16.68 |
| iso-alkane | 10.34 |
| Σ alkene | 55.32 |
| n-alkene | 16.53 |
| iso-alkene | 38.79 |
| cyclanes | 6.66 |
| aromatics | 11.00 |

APPLICATION EXAMPLE 4

The result in table 4 is obtained with the adjustment of reaction conditions indicated in table 4. In the application of Examples 1–3, in addition to the changes of hydrocarbon composition caused by the catalyst, the following parameters of overall efficiency, product yield and varying range of temperature, etc., have the same correlation as shown in Table 4.

TABLE 4

| Items | A | B | C |
| --- | --- | --- | --- |
| Amount of feed (Ton) | 5 | 5 | 5 |
| Catalyst | Example 1 | Example 2 | Example 3 |
| Reaction time (hr.) | 11 | 8 | 9 |
| Temp. of liquid phase (°C.) | 337–389 | 341–384 | 315–376 |
| Temp. range (°C.) | 52 | 43 | 61 |
| Temp. of vapor phase (°C.) | 91–124 | 89–110 | 83–131 |
| Temp. range (°C.) | 33 | 21 | 48 |
| Temp. of top part (°C.) | 210–267 | 231–273 | 209–275 |
| Temp. range (°C.) | 57 | 42 | 66 |
| Yield (%) | 84.3 | 81.6 | 76.8 |

In sum, the advantages of the catalyst of this invention are low loss of lean gas, high average yield, long operation period, abundant resources of raw materials, low cost, and simple process, and satisfactory quality of products.

I claim:

1. A catalyst used for treating waste plastics, comprising a carrier and active components having the following formula:

$$A_a B_b Al_c M_d Na_e Ca_f Fe_g O_x$$

wherein A is selected from the group consisting of potassium, barium, phosphorus, vanadium, chromium, rare earth elements and their mixture, B selected from the group consisting of molybdenum, tungsten, nickel, germanium and platinum series, and M selected from WO or $(NH_4)_2WO_4$, wherein a is from 25 to 26.35 percent by weight; b from 36 to 37.05 percent; c from 7.2 to 9 percent; d from 1.14 to 1.55 percent; e from 1.75 to 2.15 percent; f from 2.40 to 2.80 percent; and g from 2.42 to 3.2 percent; and x is a sum of oxygen needed for chemical bonding valences of said components in the catalyst.

2. The catalyst of claim 1, wherein the carrier in the catalyst is silica.

3. A method for preparing a catalyst for treating waste plastics, comprising the steps of:
   (a) pulverizing a tail ore together with a mixture of $Al_2O_3$, $MoS_2$, $NaNO_3$, and $Fe_3O_4$ at a weight ratio of less than 1:0.1 into a fine powder;
   (b) mixing the powder with a silica gel to obtain a slurry with added water;
   (c) forming pellets from said slurry;
   (d) thermally treating the pellets at a temperature of about 300° C. to 400° C. for about 20 to 30 min.; and
   (e) roasting the thermally treated pellets at a temperature of about 400° C. to 800° C. for about 4–5 hours.

4. The method of claim 3, wherein each of the pellets has a diameter of 6 mm and a length of 6 mm.

5. The method of claim 3, wherein the silica gel is $Na_2SiO_3$.

6. The method of claim 3, wherein the fine powder is of 80–120 μm in size.

7. A method for preparing a catalyst for treating waste plastics, comprising the steps of:
   (a) blending active components with a quasi thin alumina powder at a weight ratio of less than 1:0.1, wherein said active components having the following formula:

$$A_a B_b Al_c M_d Na_e Ca_f Fe_g O_x$$

wherein A is selected from the group consisting of potassium, barium, phosphorus, vanadium, chromium, rare earth elements and their mixture, B selected from the group consisting of molybdenum, tungsten, nickel, germanium and platinum series, and M selected from WO or $(NH_4)_2WO_4$, wherein a is from 25 to 26.35 percent by weight; b from 36 to 37.05 percent; c from 7.2 to 9 percent; d from 1.14 to 1.55 percent; e from 1.75 to 2.15 percent; f from 2.40 to 2.80 percent; and g from 2.42 to 3.2 percent; and x is a sum of oxygen needed for chemical bonding valences of said components in the catalyst,
   (b) mixing the blended mixture with a silica gel to obtain a slurry with added water;
   (c) forming pellets from said slurry;
   (d) thermally treating the pellets at a temperature of about 300° C. to 400° C. for about 20 to 30 min.; and
   (e) roasting the thermally treated pellets at a temperature of about 400° C. to 800° C. for about 4–5 hours.

8. The method of claim 7, wherein the active components include at least oxides of potassium, barium, phosphorus, vanadium, chromium, rare earth elements and their mixture, oxides of molybdenum, tungsten, nickel, germanium and platinum group metals, wherein $Al_2O_3$, $MoS_2$, $NaNO_3$, and $Fe_3O_4$.

9. The method of claim 7, wherein each of the pellets has a diameter of 6 mm and a length of 6 mm.

10. The method of claim 7, wherein the silica gel is $Na_2SiO_3$.

11. The method of claim 7, wherein the active components are in a fine powder of 80–120 μm in size.

* * * * *